United States Patent
Kreuzer et al.

[15] 3,699,891
[45] Oct. 24, 1972

[54] ROCKET VEHICLE AND METHOD OF MANUFACTURING SAME

[72] Inventors: John A. Kreuzer, Mission Viejo; David E. Thompson, Irvine, both of Calif.

[73] Assignee: The Susquehanna Corporation, Fairfax County, Va.

[22] Filed: April 23, 1969

[21] Appl. No.: 818,679

[52] U.S. Cl................................................102/49.3
[51] Int. Cl.............................................F42b 13/28
[58] Field of Search............86/1; 102/49.3, 49.2, 34; 60/224, 255, 35.6 RS

[56] References Cited

UNITED STATES PATENTS

| | | | |
|---|---|---|---|
| 2,112,758 | 3/1938 | Blacker | 102/49.3 |
| 2,853,946 | 9/1958 | Loedding | 102/49.3 |
| 2,918,751 | 12/1959 | Johnson | 102/34 X |
| 2,990,684 | 7/1961 | Cohen | 60/255 |
| 3,015,209 | 1/1962 | Geckler | 60/255 |
| 3,117,520 | 1/1964 | Kerr et al. | 224/3.24 |
| 3,358,603 | 12/1967 | Hohenner | 60/254 |
| 3,401,525 | 9/1968 | Schubert et al. | 60/255 |
| 3,401,634 | 9/1968 | Martin et al. | 102/49.7 |

*Primary Examiner*—Verlin R. Pendegrass
*Attorney*—Tipton D. Jennings

[57] ABSTRACT

A rocket vehicle comprising a body formed of a lightweight material, such as foamed plastic, and a center support tube mounted within the vehicle body and formed of a lightweight, rigid material having relatively high structural strength, such as aluminum. The tube is utilized to support a rocket motor mounted within the vehicle body and to support ballast and the forward end of the vehicle body. The tube serves to transfer the thrust loads of the rocket motor into the relatively weak lightweight body material by presenting a large shear surface between the body and the tube. In a preferred method of manufacture, the support tube is positioned within a mold cavity having a configuration complementary with the external configuration of the rocket vehicle body. Foamed material is then introduced into the mold to form the vehicle body about the support tube.

13 Claims, 6 Drawing Figures

PATENTED OCT 24 1972 3,699,891
SHEET 1 OF 2
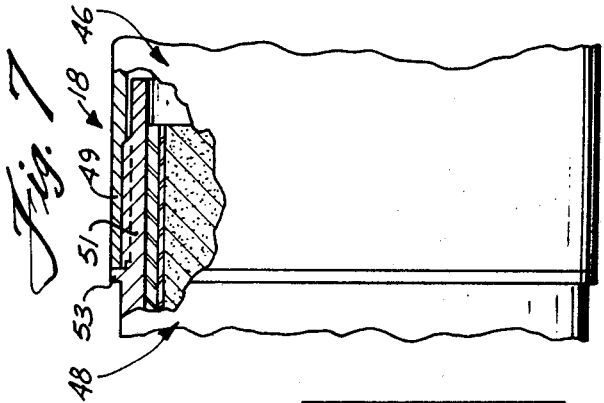
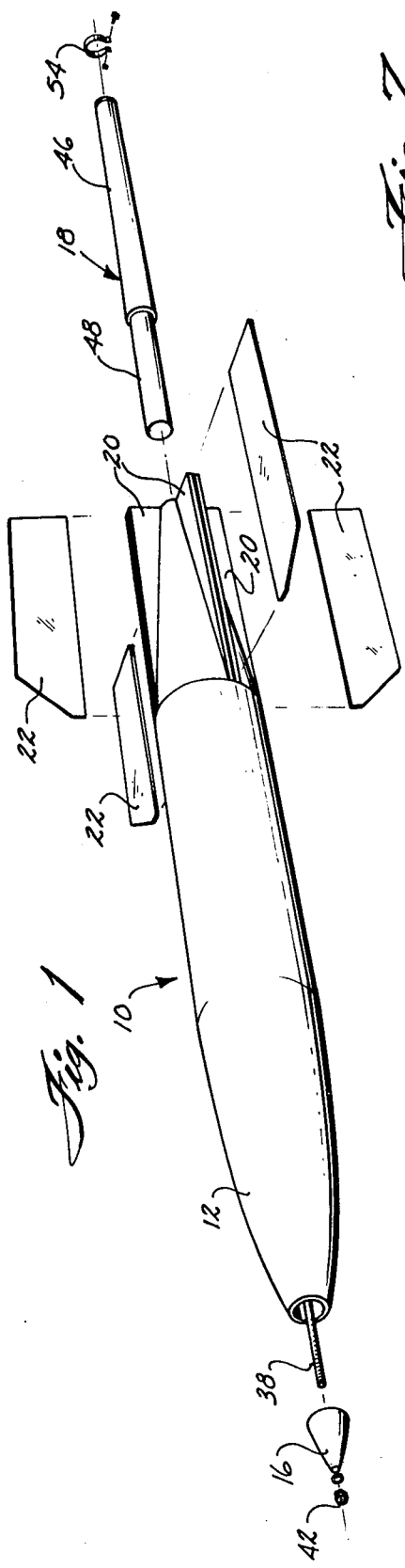
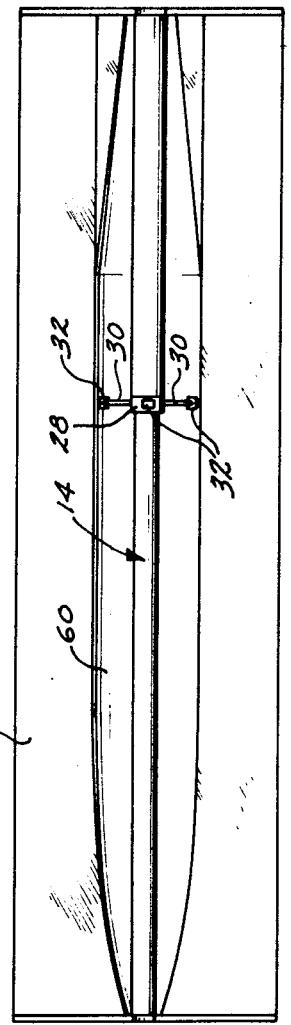
INVENTORS
JOHN A. KREUZER
DAVID E. THOMPSON
BY Frank P. Presta
ATTORNEY

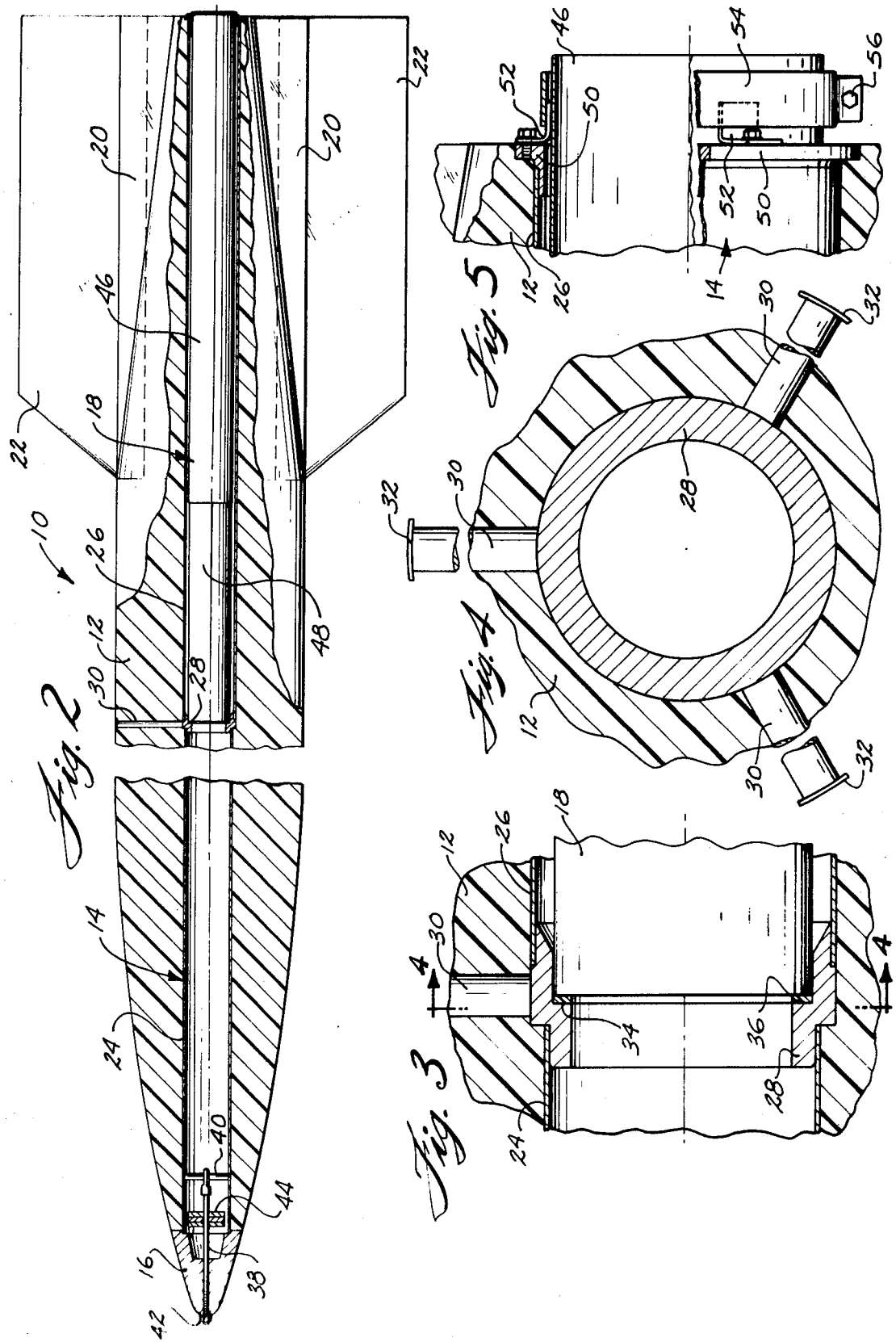

3,699,891

ROCKET VEHICLE AND METHOD OF MANUFACTURING SAME

BACKGROUND AND SUMMARY OF THE INVENTION

This invention relates generally to a rocket vehicle and, more particularly, to a lightweight rocket vehicle which is useful as a target vehicle, and to a method of manufacturing such a vehicle.

Heretofore, many types of aerial targets have been used. Many of the lightweight and easily handled targets have not been self-propelled and thus have required towing by an aircraft, with the consequent disadvantages of (1) some risk to the aircraft towing the target being fired upon, and (2) failure to truly simulate flying aircraft. The aerial targets which have been provided with their own propulsion systems generally have been expensive to manufacture, difficult to handle and/or unreliable in operation. Accordingly, a need has arisen for a simple, lightweight, inexpensive, self-propelled aerial target vehicle.

It is an object of the present invention, therefore, to provide a new an improved self-propelled, aerial target vehicle.

An additional object is to provide such a target vehicle which is lightweight, simple in construction, capable of low-cost mass production, and easy to handle and launch.

A further object is to provide such a target vehicle which can be provided with a single or dual thrust propulsion system.

A still further object is to provide such a target vehicle to which a nose cone and ballast can be readily attached.

Another object is to provide such a target vehicle having a one-piece body construction formed of a lightweight material.

Still another object is to provide such a target vehicle which is so constructed as to minimize and evenly distribute the thrust loads on the lightweight, relatively weak vehicle body.

Yet another object is to provide a new and improved method of manufacturing such a self-propelled target vehicle.

Numerous other objects and advantages of the present invention will be apparent as it is better understood from the following description, which, taken in connection with the accompanying drawings, discloses a preferred embodiment thereof.

The above objects are accomplished by providing a target vehicle having a body formed of a lightweight material, such as a molded foamed material. Mounted within the vehicle body is an elongated support tube formed of a lightweight, relatively strong, rigid material such as aluminum. The tube is utilized to support a rocket motor within the vehicle body and to support ballast at the forward end of the body. The tube transfers the thrust loads of the rocket motor into the relatively weak, lightweight body by presenting a large shear surface between the body and the tube. The rocket motor may comprise a single or a dual thrust propulsion system.

In a preferred method of manufacture, the support tube is positioned within a mold cavity having a configuration complementary with the external configuration of the target vehicle body. Lightweight moldable material, such as a suitable foamed plastic, is thereafter introduced into the mold cavity to form the target vehicle body about the structure tube. Fins may be molded integrally with the body or may be secured to the body after the molding operation.

Referring to the drawings:

FIG. 1 is an exploded view in perspective of a rocket vehicle constructed in accordance with the principles of the instant invention;

FIG. 2 is a side elevational view, partly in section, of a fully assembled rocket vehicle constructed in accordance with the principles of the instant invention;

FIG. 3 is an enlarged sectional view of a portion of the rocket vehicle shown in FIG. 2;

FIG. 4 is a sectional view taken substantially along line 4—4 in FIG. 3;

FIG. 5 is an enlarged sectional view of the rear portion of the rocket vehicle shown in FIG. 2;

FIG. 6 is a plan view showing the support tube mounted within the cavity of a mold half in accordance with the method of the instant invention; and FIG. 7 is an enlarged elevational view in section, with parts broken away, of the connection between the booster and sustainer motors.

DESCRIPTION OF THE PREFERRED EMBODIMENT

As a preferred or exemplary embodiment of the instant invention, FIGS. 1 and 2 disclose a rocket vehicle 10 having a body 12 formed of a lightweight material, such as a foamed plastic or other suitable material. A support tube 14 formed of a lightweight, substantially rigid material having relatively high structural strangth, such as aluminum or another suitable material, is mounted within and extends longitudinally through substantially the entire length of the rocket vehicle body 12. A nose cone 16 is mounted on the front portion of the vehicle body 12 and is secured to the support tube 14 in a manner to be described hereinafter. A rocket motor 18 is mounted within the rear portion of the tube 14 and is secured thereto in a manner to be described hereinafter. The vehicle body 12 is provided with a plurality of longitudinally extending fin supports 20 having slots in which fins 22 are mounted and secured thereto in any suitable manner. The fins 22 may be formed of any suitable lightweight material such as plywood.

As shown in FIGS. 2 and 3, the support tube 14 comprises a front tubular section 24 and a rear tubular section 26 that are secured in any suitable manner to a thrust ring 28. The thrust ring 28 has secured thereto a plurality of radially outwardly extending arms 30 (see FIG. 4) that are embedded within the rocket vehicle body 12. Each of the arms 30 terminates outwardly in a curved plate member 32 for a purpose to be described hereinafter. The thrust ring 28 is provided with a rearwardly facing annular surface 34 on which an annular gasket 36 is secured in any suitable manner. The front end of the motor 18 is slidably received within the rear portion of the thrust ring 28 and abuts against the gasket 36, as illustrated in FIGS. 2 and 3.

Referring to FIGS. 1 and 2, a nose cone 16 is adapted to abut against the front ends of the vehicle body 12 and the support tube 14, and is provided with a longitudinally extending opening in the center portion thereof through which a threaded rod 38 extends. The rod 38 is pivotally secured at its inner end to a transverse rod 40 secured to the support tube 14. A nut 42 is threaded onto the outer end of the rod 38 to retain the nose cone 16 in position on the front end of the rocket vehicle body 12. The nose cone 16 may be formed of any suitable material and, if it is desired to utilize the nose cone to provide ballast for the front end of the rocket vehicle, the nose cone may be formed of a suitable, relatively heavy material, such as cast iron. If desired, additional ballast 44 may be mounted on the tube 38 and secured thereto in any suitable manner.

The rocket motor 18 may comprise a single or dual thrust propulsion system. As shown in FIGS. 1, 2 and 7, the motor 18 preferably utilizes a dual thrust propulsion system comprising a solid propellant booster motor 46 and a solid propellant sustainer motor 48 which may be of any suitable or conventional construction. Preferably, the booster motor 46 is provided with an internally threaded portion 49 at its forward end, and the sustainer motor 48 is provided with an externally threaded portion 51 at its aft end which is receivable within the booster portion 49. The sustainer 48 has an outwardly extending annular flange or stop 53 which is engageable with the forward end of booster portion 49. The sustainer motor 48 is in communication with the booster chamber and nozzle (not shown) so that after booster burnout the sustainer provides propulsion through utilization of the booster chamber and nozzle. If a single thrust propulsion system is desired, the sustainer motor may be replaced by a simulator which is secured to the front end of the booster motor so as to take up the space provided for the sustainer motor and to properly engage the thrust ring 28.

Referring now to FIG. 5, the rear tubular section 26 of the support tube 14 is secured at its rear end to a support ring 50. A plurality of flexible and resilient retaining clips 52 are secured to the support ring 50 in any suitable manner and are adapted to engage the adjacent outer surface of the rear portion of the booster motor 46. A clamping ring 54 surrounds the portion of the clips 52 engaging the motor 46 and is adapted to be tightened by a nut-and-bolt connection 56, or other suitable type of connection, to urge the clips 52 into tight engagement with the motor 46 and thus retain the motor within the support tube 14.

In accordance with the method of the instant invention, and referring to FIG. 6, the support tube 14 is first positioned within the cavity 60 of a first mold half 62 that is movably connected to or otherwise adapted to mate with a second mold half (not shown). The cavity 60 has a configuration that is complementary with the external configuration of the rocket vehicle body 12. The ends of the support tube 14 are supported by the adjacent ends of the mold 62, and the mid portion of the support tube 14 is supported within the mold cavity 60 by the radially outwardly extending arms 30 of the thrust ring 28. The curved plate members 32 on the outer ends of the arms 30 are curved in a manner complementary with the curvature of the mold cavity surface so as to uniformly engage the mold cavity surface and to accurately and firmly position the support tube 14 therein.

After the support tube 14 is positioned within the mold cavity 60, the second mold half (not shown) having a cavity complementary with the cavity 60, is positioned over the mold half 62 to enclose the support tube 14. Thereafter, moldable material, such as a foamed plastic, is introduced into the cavity defined by the mold halves to mold the rocket vehicle body 12 about the support tube 14. The support tube 14, therefore, is molded in place within the vehicle body 12, and the radially extending arms 30 of the thrust ring 28 are embedded within the vehicle body 12 to firmly anchor the support tube within the body.

When the molding operation is completed, the mold halves are separated and the molded vehicle body 12 and enclosed support tube 14 are removed therefrom. The fins 22, nose cone 16 and motor 18 may then be mounted on or within the rocket vehicle body 12 in the manner described above. Since the nose cone 16 and motor 18 are secured to the support tube 14, the loads therefrom are absorbed by the support tube 14 and evenly distributed into the relatively weak, lightweight body 12 via a large shear surface between the body 12 and the support tube 14 equal to the external surface of the tube.

Although separate fins 22 are shown as being mounted within longitudinal channels in the vehicle body portions 20, it is within the scope of the instant invention to mold the fins integrally with the vehicle body, rather than forming them separately and attaching them to the body.

Since the instant rocket vehicle 10 is lightweight, simple in construction and easily and cheaply manufactured, it is ideally suited for use as an aerial target vehicle. In such instances, the support tube 14 can serve to provide for radar cross section if it is made of a suitable material such as aluminum. The vehicle 10 may be easily transported with the nose cone 16, motor 18 and fins 22 in assembled relation, or alternatively, the rocket vehicle body, nose cone, motor and fins may be separately transported and assembled at the launch site. The rocket vehicle 10 may be launched by any suitable type of mobile or permanent launching means (not shown).

It is thought that the invention and many of its attendant advantages will be understood from the foregoing description, and it will be apparent that various changes may be made in the instant construction and method without departing from the spirit and scope of the invention or sacrificing all of its material advantages, the form hereinbefore described being merely a preferred embodiment thereof.

We claim:

1. A rocket vehicle, comprising:
   a solid elongated body formed of lightweight, molded, material,
   a support tube molded in place within said body and extending longitudinally through substantially the entire length of said body,
   said support tube being adapted to receive and support a rocket motor therewithin adjacent the rear end of said body, and
   a nose positioned adjacent the front end of said body and secured to said tube.

2. The rocket vehicle of claim 1 wherein said material is a foamed plastic material.

3. The rocket vehicle of claim 2 wherein said tube is formed of a lightweight, metallic material.

4. The rocket vehicle of claim 1 wherein said tube comprises a radially inwardly extending thrust ring which is adapted to be engaged by the front end of a rocket motor to position it within said tube.

5. The rocket vehicle of claim 4 wherein said thrust ring comprises a plurality of radially outwardly extending arms that are embedded in said body.

6. The rocket vehicle of claim 4 wherein said tube further comprises a support ring at the rear end thereof, and a plurality of retaining clips secured to said support ring and adapted to engage the rear end of a rocket motor disposed within said tube.

7. The rocket vehicle of claim 6 further comprising clamp means adapted to engage said clips and urge them into tight engagement with the aft end of a rocket motor positioned within said tube to retain it therewithin.

8. The rocket vehicle of claim 1 further comprising a plurality of fins of lightweight material secured to the rear portion of said body.

9. The rocket vehicle of claim 1 wherein said nose is provided with a center opening extending longitudinally therethrough, a rod is secured to said tube and extends through said nose opening, and locking means is secured on the outer end of said rod in engagement with said nose to retain it in position on said body.

10. A rocket vehicle comprising:
   a solid elongated body formed of a lightweight, molded, material,
   a support tube molded in place within said body and extending longitudinally through substantially the entire length of said body,
   a rocket motor mounted within and secured to said tube adjacent the rear end of said body, and
   a nose cone positioned on the front end of said body and secured to said tube.

11. The rocket vehicle of claim 10 wherein said material is a foamed plastic material, and said tube is formed of a lightweight metallic material.

12. The rocket vehicle of claim 10 wherein said body is provided with a plurality of longitudinally extending slots in the rear portion thereof, and wherein a plurality of lightweight fins are positioned within said slots and secured to said body.

13. The rocket vehicle of claim 10 wherein said rocket motor comprises a dual propulsion system having a forward sustainer and a rear booster removably secured thereto in a manner such that said sustainer motor exhausts through said booster motor.

* * * * *